(12) United States Patent
Arai et al.

(10) Patent No.: US 7,821,377 B2
(45) Date of Patent: Oct. 26, 2010

(54) REMOTE CONTROLLER, EQUIPMENT OPERATION SYSTEM, AND REMOTE CONTROL METHOD

(75) Inventors: Morito Arai, Tokyo (JP); Akira Katsuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1183 days.

(21) Appl. No.: 11/443,079

(22) Filed: May 31, 2006

(65) Prior Publication Data

US 2006/0267726 A1 Nov. 30, 2006

(30) Foreign Application Priority Data

May 31, 2005 (JP) .............................. 2005-159552

(51) Int. Cl.
*G05B 23/02* (2006.01)

(52) U.S. Cl. ................. 340/3.71; 340/825.72; 341/176; 348/734

(58) Field of Classification Search ................. 340/3.71, 340/3.7, 826.69, 825.72, 825.22, 825.24, 340/825.25, 825.69; 341/176; 348/734, 348/705; 398/107, 108, 111, 112
See application file for complete search history.

(56) References Cited

U.S. PATENT DOCUMENTS 4,825,209 A * 4/1989 Sasaki et al. ........... 340/825.72
5,959,539 A * 9/1999 Adolph et al. ............... 340/3.5
6,127,941 A * 10/2000 Van Ryzin ............. 340/825.69
6,160,491 A * 12/2000 Kitao et al. ............ 340/825.69
6,400,280 B1 * 6/2002 Osakabe ................ 340/825.25
2002/0089427 A1 * 7/2002 Aratani et al. ......... 340/825.72
2005/0088278 A1 * 4/2005 Harada ...................... 340/3.71

\* cited by examiner

*Primary Examiner*—Edwin C Holloway, III
(74) *Attorney, Agent, or Firm*—Oblon, Spivak, McClelland, Maier & Neustadt, L.L.P.

(57) ABSTRACT

A remote controller having a plurality of keys arranged thereon, sending a remote control signal allocated to each of the keys upon being operated to thereby remotely control control-target equipment. The remote controller can send a remote control signal corresponded to each of the control-target equipment by mode switching and allows a remote control of selection in which specific equipment out of the control-target equipment can select a signal from the other control-target equipment. The remote controller includes an input selection key for directing the selection on the one specific equipment; a receiver receiving a connected equipment signal; a controller generating and sending a remote control signal corresponding to an operation of the key, and effecting the mode switching based on the connected equipment signal, thereby selecting control-target equipment; a transmitter sending the remote control signal; and a display displaying information of the selected control-target equipment.

10 Claims, 7 Drawing Sheets

REMOTE CONTROLLER, EQUIPMENT OPERATION SYSTEM, AND REMOTE CONTROL METHOD

CROSS REFERENCES TO RELATED APPLICATIONS

The present document contains subject matter related to Japanese Patent Applications JP 2005-159552 and JP 2006-118285 filed in the Japanese Patent Office on May 31, 2005 and Apr. 21, 2006, respectively, the entire contents of which being incorporated herein by reference.

BACKGROUND OF THE INVENTION

1. Field of the Invention

The present invention relates to a remote controller capable of preferably applying, for example, a control signal to control of electronic equipment such as a TV receiver and the like, an equipment operation system allowing signal transmission between the remote controller and electronic equipment, and a remote control method.

2. Description of Related Art

In the past, a remote controller, based on infrared wireless transmission of control signals, has been used for remote control of video equipment such as TV receiver, and of audio equipment. In tuning operation of a TV receiver or the like using the remote controller, a user selects any of the numeral keys provided on the remote controller, and presses it down. By this operation, a remote control signal allocated to each of the keys is transmitted as being carried on infrared radiation from the remote controller to the TV receiver. The TV receiver has, as being preliminarily set therein, tuning positions corresponded to the remote control signals, and effects switching among broadcasting channels on the basis of the infrared signal received from the remote controller, to thereby complete the tuning operation.

There is also known a system having electronic equipment such as a TV receiver and an audio-visual (AV) amplifier provided with a plurality of input terminals, and external equipment such as various recorders, players, tuners and the like connected to the input terminals, so as to allow a single remote controller to remotely control the various equipment. The remote controller used in this system can effect switching not only of the TV receiver or the AV amplifier, but also of any connected external equipment. In switching of the equipment to be operated, the user has to begin with input switching operation on the TV receiver side. For an exemplary TV receiver having provided thereto four input terminals from a first input terminal to a fourth input terminal, correlation is preliminarily made such that the first input terminal is for a DVD (digital versatile disc) recorder, the second terminal is for a video tape recorder and so on. The connected external equipment are selected by switching the input of the TV receiver. This sort of remote controller has provided thereon operation switch keys selecting equipment to be operated such as the TV receiver, DVD recorder, AV amplifier and so forth. The user has been allowed to operate target equipment, after switching the input of the TV receiver and operating any operation switch key on the remote controller so as to change modes of the remote controller.

An assumption is now made on a case where a user, who has been viewing a ground-wave analog broadcasting, wishes to change the operation into DVD play on a DVD recorder. The user first makes a switching operation for enabling input of the DVD recorder connected to the TV receiver. Then the DVD recorder is selected by the operation switch key on the remote controller. A remote control signal corresponded to the DVD operation is then sent on infrared radiation from the remote controller to the TV receiver. The user is thus allowed to make operations of record, play, stop and so forth of the DVD recorder.

Japanese Patent Application Publication (KOKAI) Hei 5-236366 describes a technique of outputting, from a remote controller, operation codes for peripheral equipment connected to a TV receiver.

SUMMARY OF THE INVENTION

By the way, for the case where an operation for selecting any equipment connected to the TV receiver, AV amplifier and so forth is made, it is necessary to operate the remote controller in a mode adapted to the connected equipment, to thereby match equipment settings between the TV receiver and the remote controller. The user therefore had to switch the equipment every time the input switching is made, raising much inconvenience.

There has been known also a remote controller having, arranged side-by-side thereon, function keys corresponded to the individual equipment so as to allow input switching and mode change of the TV receiver and the remote controller at the same time. Such remote controller, however, needs a large number of function keys provided thereon corresponding to the equipment to be connected, so that an excessive space is occupied by the operation keys. Another operation already put into practical use is such as displaying a menu on a display panel of the TV receiver with the aid of a GUI (graphical user interface) or the like, so as to allow input switching typically through operation of a cursor provided on the remote controller. However, input set on the TV receiver and the mode set on the remote controller are not automatically correlated, so that the user could not operate any equipment corresponded to an input, unless input switching is made on the TV receiver, and unless a mode is newly set on the remote controller.

The present invention is conceived after considering the above-described situation, and enables, for the case where a plurality of electronic equipment are to be remotely controlled, setting for readily switching among the individual electronic equipment.

For a case where a remote control signal corresponded to each of a plurality of control-target equipment can be sent by mode switching, and one specific equipment out of the plurality of control-target equipment can select a signal from the other control-target equipment, and the selection can be remotely controlled, the present invention was configured so as, upon reception of a connected equipment signal sent from the one specific equipment based on the selection, after operation of the input selection key provided as one type of key out of the plurality of keys, for directing the selection on the one specific equipment, to effect the mode switching on the basis of the received connected equipment signal, to thereby select a control-target equipment to be remotely controlled by the remote control signal; and so as to display information on the selected control-target equipment.

In this configuration, selection operation selecting an input of a specific control-target equipment is made on the remote controller, and a remote control signal resulted from the operation is sent, to thereby allow input selection operation to proceed on the specific control-target equipment. A connected equipment signal of the equipment connected to the input switched by the selection operation is then returned, and in accordance with a judgment made on thus-returned signal, a processing of switching the control-target equipment remotely operable through the remote controller into any sort of equipment judged in the above is proceeded. The event that the control-target equipment remotely operable has been switched is also displayed.

According to the present invention, for the case where the control-target equipment operable through the remote controller is wished to be switched, the control-target equipment is automatically switched on the remote controller by carrying out an operation for switching input of specific control-target equipment, and this raises an effect of improving convenience of the operation.

DESCRIPTION OF THE EMBODIMENTS

Paragraphs below will describe one embodiment of the present invention referring to the attached drawings. This embodiment relates to the present invention applied to a remote controller and an equipment operation system, configured as remotely controlling a TV receiver by transmitting on infrared radiation a predetermined control signal to the TV receiver through key operation by the user, and receiving an infrared signal from the TV receiver by the remote controller, to thereby allow switching of mode setting on the remote controller.

Figure 1:
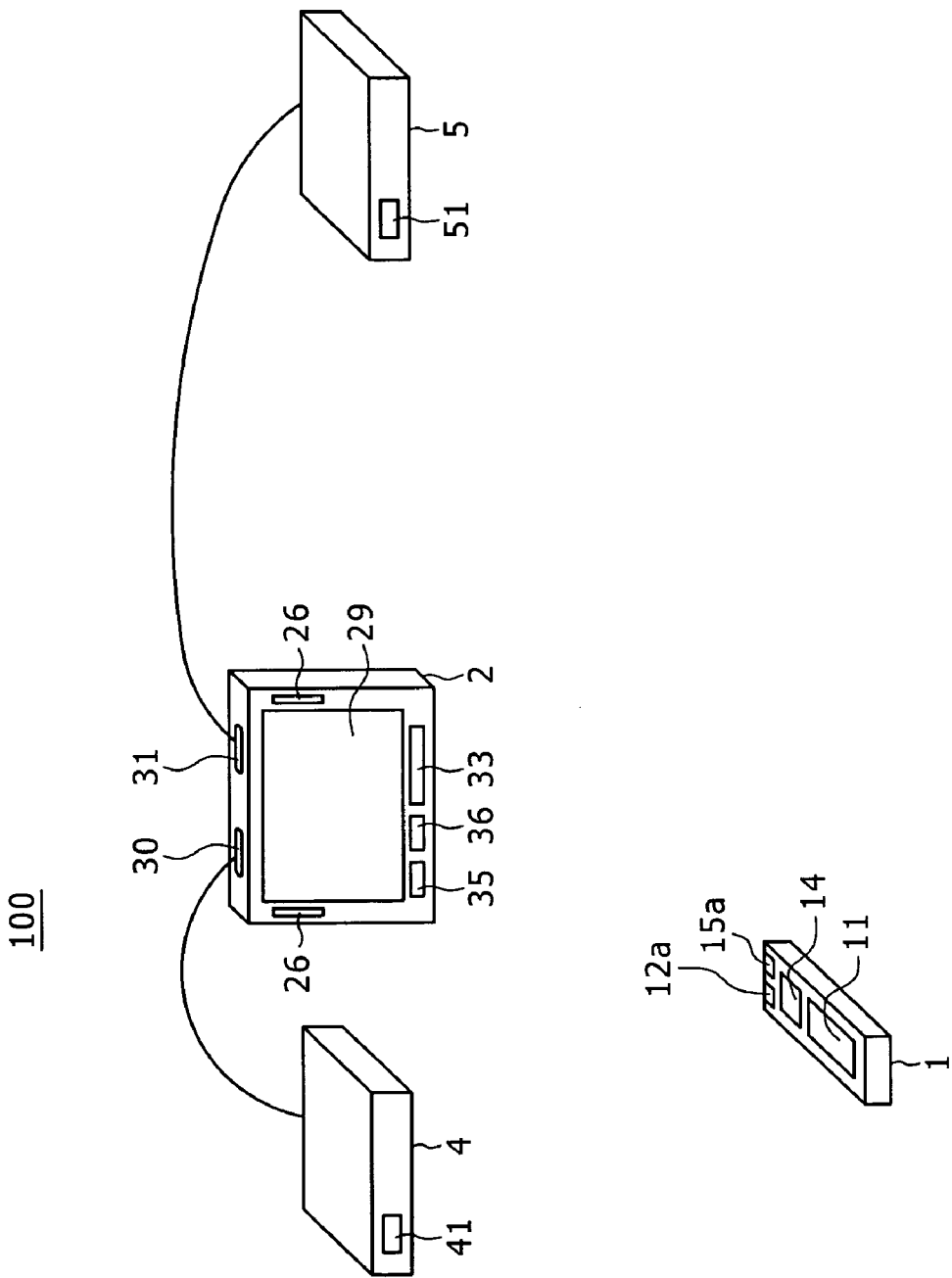
FIG. 1 is a configuration drawing showing an exemplary equipment operation system in one embodiment of the present invention.

First, an exemplary configuration of the equipment operation system of the embodiment will be explained referring to FIG. 1. A TV receiver 2 converts signals in broadcasting wave received by an antenna not shown, to thereby receive a TV broadcasting program. As peripheral equipment externally disposed, there are provided a DVD recorder 4 capable of recording and playing using, as a recording medium, an optical disc conforming to the DVD standard, and a video tape recorder 5 capable of recording and playing using a video tape. The equipment are respectively connected through cables to a first input terminal 30 and a second input terminal 31 provided to the TV receiver 2, allowing video and audio play signals to be supplied therethrough. The whole system thus configured by connecting the DVD recorder 4 and the video tape recorder 5 to the TV receiver 2, as being controllable by a remote controller 1, is referred to as an equipment operation system 100. The TV receiver 2 is provided with a liquid crystal display panel 29, and loudspeakers 26 for audio output disposed on both sides of the display panel 29, so as to allow reproduction of video and audio data provided from television broadcasting, the DVD recorder 4, and the video tape recorder 5. The TV receiver 2 is also provided with an operation section 33 allowed for operations such as tuning, volume setting and so forth.

The remote controller 1 allowing the user to remotely control therethrough the TV receiver 2 can remotely control also the DVD recorder 4 and the video tape recorder 5 by mode switching. Equipment to be remotely controlled through the remote controller 1 are referred to as control-target equipment. The remote controller 1 has an operation section 11 having various keys provided therein, and a display 14 provided with a liquid crystal panel allowing thereon display of a mode to be operated. There are also provided a light emitting element 15a emitting infrared signals, and a light receiving element 12a receiving the infrared signals. An exemplary external configuration and an exemplary internal configuration of the remote controller 1, and details of the processing will be detailed later.

The DVD recorder 4 and the video tape recorder 5 are respectively provided with receiver sections 41, 51 which receive the infrared signals sent from the remote controller 1. On the remote controller 1, there are provided an up key 11k and a down key 11m (FIG. 2) for operation switching used for switching the control-target equipment in response to a switching input. The user switches control-target equipment to be operated, by selecting the up key 11k or the down key 11m for operation switching. For example, by pressing the up key 11k for operation switching on the remote controller 1 so as to designate "DVD", the user can remotely control the DVD recorder 4 through the remote controller 1.

Also on the TV receiver 2, there is provided a receiver section 35 which receives infrared signals sent from the remote controller 1. It is therefore made possible to operate channel and volume of the TV receiver, by designating "TV" using the up key 11k or the down key 11m for operation switching on the remote controller 1. The TV receiver 2 of this embodiment is further equipped with a transmitter section 36 which sends the infrared signals to the remote controller 1. The infrared signals sent out by the TV receiver 2 are received by the light receiving element 12a provided in a receiver section 12 of the remote controller 1. Details of the processing based on transmission of the infrared signals will be described later.

Figure 2:
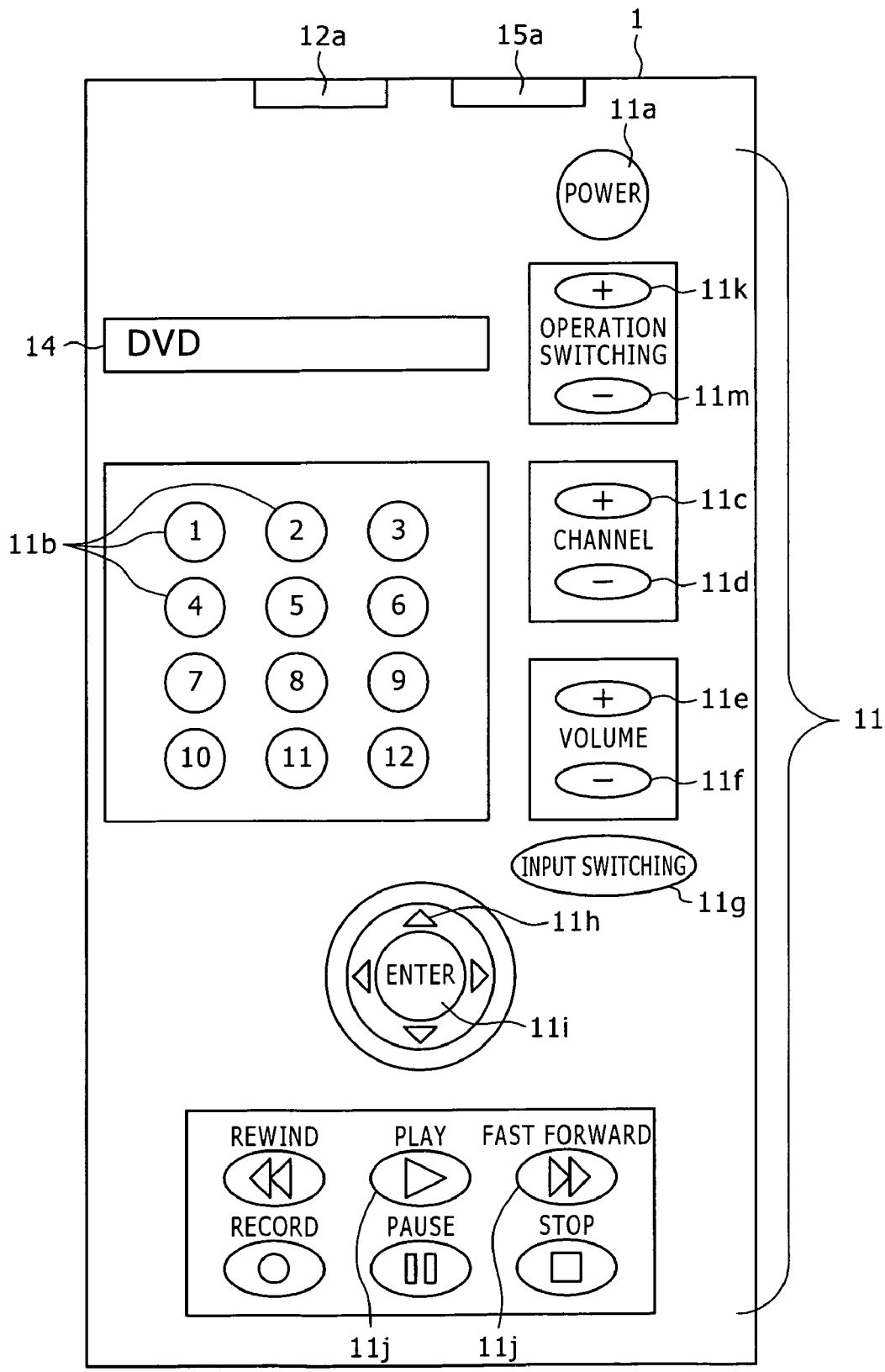
FIG. 2 is an external configuration drawing showing an exemplary remote controller in one embodiment of the present invention.

Next, an exemplary external configuration of the remote controller 1 of the present embodiment will be described referring to FIG. 2. The remote controller 1 capable of remotely operating electronic equipment such as TV receiver has the light receiving element 15a composed of an LED (light emitting diode) outputting the infrared signals, and the light receiving element 12a receiving the infrared signals disposed therein. There is also disposed a display 14 composed of a liquid crystal display panel, allowing thereon display of characters such as "TV", "DVD", "AMP" or the like.

The remote controller 1 has an operation section including various operation keys. The operation section 11 is provided with the operation switching up key 11k and the down key 11m which switch among control-target equipment on the remote controller. The operation section 11 is also provided with a power key 11a turning on/off a power source of the control-target equipment set by operation of the up key 11k and the down key 11m. FIG. 2 shows an exemplary state in which the display 14 indicates "DVD", and the remote controller 1 is set to an operating mode for the DVD recorder. Details of the mode will be described later.

The remote controller 1 has numerals from "1" to "12" printed thereon, and is provided with number keys 11b as direct channel selection keys allowing the user to press them down to effect channel selection. Channel selection position can be designated by sending a remote control signal of a code allocated to each of the number keys 11b to the TV receiver 2. When the operation mode of the equipment is set to equipment other than TV receiver, they function as the keys for designating channel selection position of thus-set equipment. The channel selection keys provided herein are a channel-up key 11c and a channel-down key 11d, in which the channel selection position is brought up by the channel-up key 11c, and is brought down by the channel-down key 11d. A volume-up key 11e and a volume-down key 11f are similarly provided as volume adjusting keys, in which the volume is increased by the volume-up key 11e, and decreased by the volume-down key 11f. An input switching key 11g is an input selection key through which input for the TV receiver 2 is selected. The input selection key 11g is a toggle selection key allowing step-wise switching upon every operation. Inputs for the TV receiver 2 can be switched using the input switching key 11g according to a loop of "INPUT 1", "INPUT 2", ... and so on.

There are also provided a direction key 11h designating up, down, left and right directions and an enter key 11i, allowing operations of displaying a menu of functions, contents and so forth on the display panel 29 of the TV receiver 2, moving the cursor, and selecting and confirming necessary items. There are also provided operation keys 11j allowing operations of "REVERSE", "PLAY", "FAST FORWARD", "RECORD", "PAUSE", "STOP" for the DVD recorder 4 and the video tape recorder 5, which are activated when the mode of the remote controller 1 is set to "DVD" and "VTR", respectively.

Figure 3:
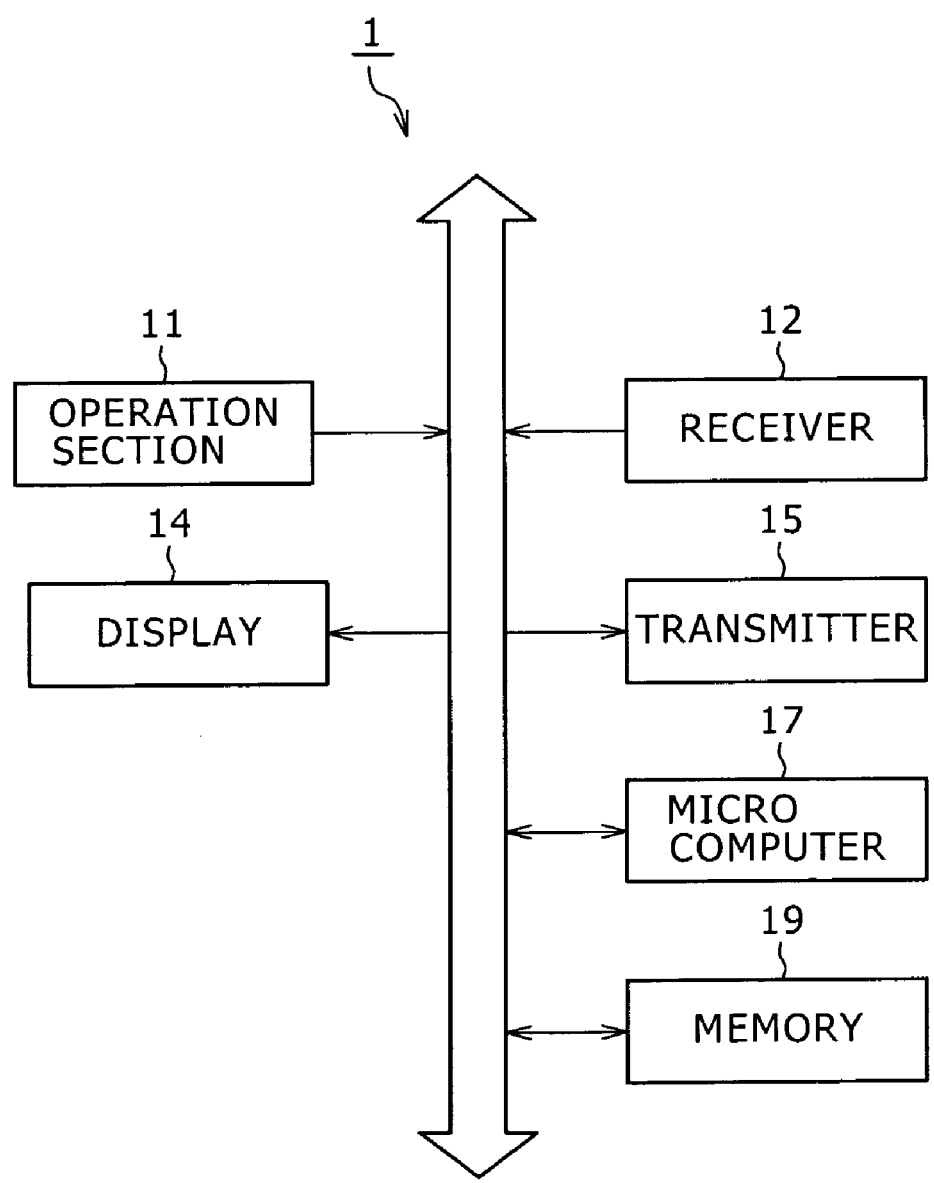
FIG. 3 is an internal configuration drawing showing the exemplary remote controller in one embodiment of the present invention.

Next paragraphs will explain an exemplary internal configuration of the remote controller 1 of this embodiment, referring to a block diagram shown in FIG. 3. Upon operation of any of the keys in the operation section 11, the operation is detected by a microcomputer taking part in internal control of the remote controller 1. A memory 19 temporarily stores data typically using a rewritable random access memory (RAM). The memory 19 also has operating programs, parameters, codes corresponded to the operation keys stored therein, typically using a read only memory (ROM) allowing reading therefrom only. The microcomputer 17 as a controller supplies remote control signals of codes corresponded to detection of the key operation to a transmitter section 15.

The transmitter section 15 modulates supplied remote control signals so as to adapt them to sending, and supplies thus-modulated signals to be sent to the light emitting element 15a in the transmitter section 15 to thereby make it illuminate. The remote control signals are thus sent from the transmitter section 15. On the other hand, the infrared signal is subjected to photo-electric conversion by the light receiving element 12a such as phototransistor, photodetector or the like, provided in the receiver section 12, and is processed for receiving by the receiver section 12. Signals received by the receiver section 12 include a status signal sent from the TV receiver 2. The status signal is a signal indicating equipment connected to the input terminal provided on the TV receiver 2. The signal received by the receiver section 12 is supplied to the microcomputer 17. The microcomputer 17 sets an operation mode of the equipment (control-target equipment) indicated by the status signal, if the status signal is judged to be received after the remote control signal is sent by operation of the input switching key 11g. According to the operation mode setting, the control-target equipment, which is remotely operable by the remote controller 1, is switched. In other words, even if the same key is operated, the resultant output of remote control signal can control different equipment. It is, however, to be noted that a part of the keys for operating the TV receiver 2 (for example, volume-up key 11e, volume-down key 11f, input switching key 11g, etc.) are always used for remote control of the TV receiver 2, irrespective of the operation mode. Upon completion of the mode setting, information (name of the control-target equipment herein) on the switched equipment is displayed as "TV", "DVD" or the like on the display 14. The display is effected on the basis of stored data in the memory 19.

Figure 4:
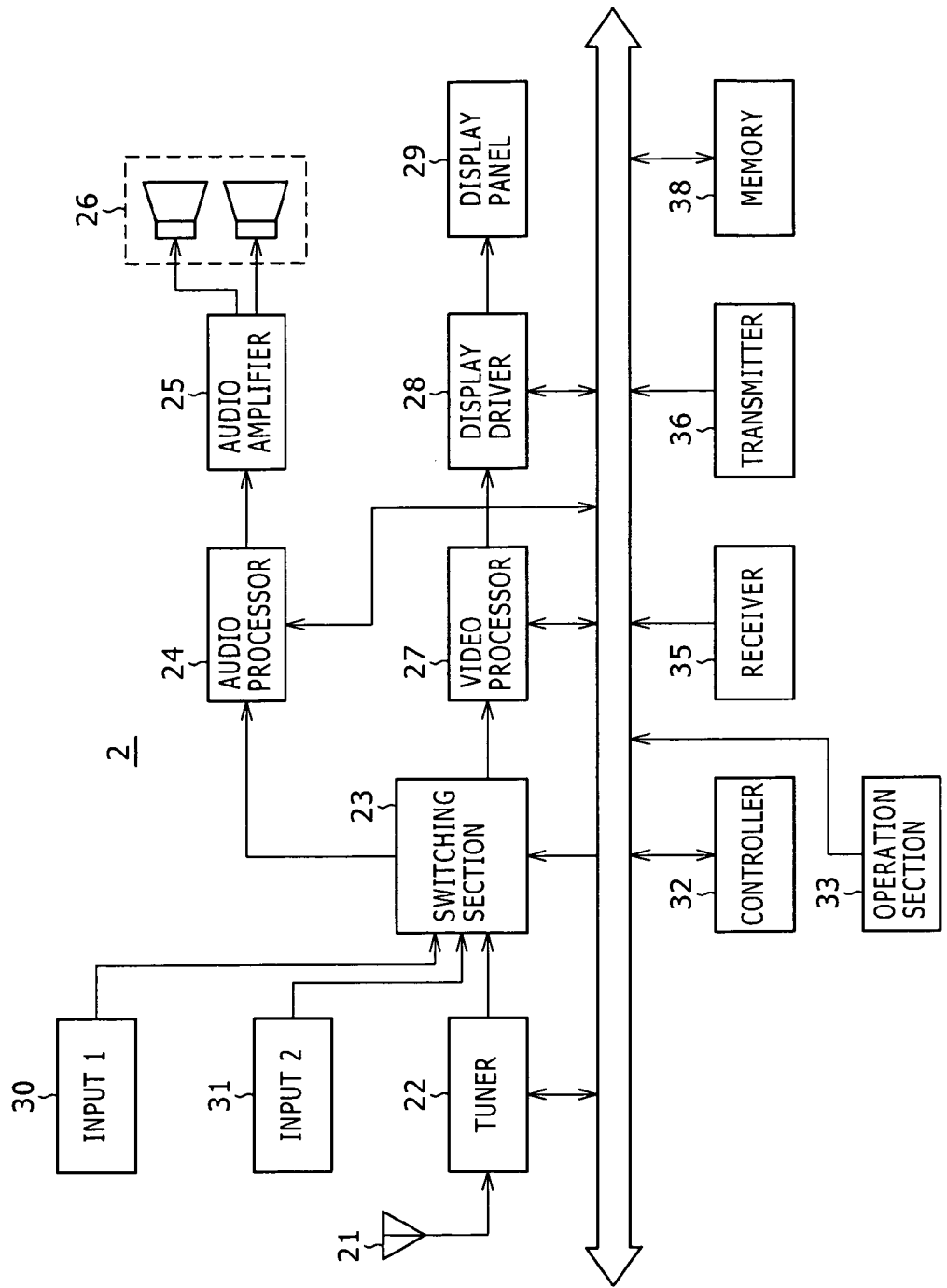
FIG. 4 is an internal configuration drawing showing an exemplary TV receiver in one embodiment of the present invention.

Next paragraphs will describe an exemplary internal configuration of the TV receiver 2 of this embodiment, referring to the block diagram shown in FIG. 4. The case shown herein is such as using a liquid crystal display as the display. The TV receiver 2 receives broadcasting wave based, for example, on the NTSC (National Television Standards Committee) system using an antenna 21, and selects a desired broadcasting station using a tuner 22. Video/audio signals selected by the tuner 22 are supplied to a switching section 23 taking part in input switching. The TV receiver 2 of this embodiment has two input terminals other than the tuner 22, allowing supply of video/audio signals from external equipment connected to the TV receiver 2 through either of a first input terminal 30 and a second input terminal 31. When viewed by the user, the input to the TV receiver 2 is switched so as to select either outputs of the first input terminal 30 and the second input terminal 31, or of the tuner 22. When audio play is desired, audio signals supplied from the switching section 23 are processed by an audio processor 24, amplified by an audio amplifier 25, and emitted from two loudspeakers 26.

When video play is desired, video signals supplied from the switching section 23 are processed by a video processor 27, and supplied to a display driver 28. The display driver 28 is composed of a liquid crystal controller or the like, and generates operation signals corresponded to liquid crystal pixels in accordance with the video signals.

The video/audio signals from the externally-disposed DVD recorder 4 and the video tape player 5 are supplied to the TV receiver 2 while being interfaced by the first input terminal 30 and the second input terminal 31, respectively. A controller 32 configured by an arithmetic circuit such as a microprocessing unit (MPU) controls processing of the TV receiver 2, and manages a memory 38 storing program, parameters and so forth. Switching by the switching section 23 is also controlled by the controller 32. The memory 38 is typically a rewritable RAM, and the connected equipment corresponding to the inputs are managed on the basis of the table below:

input connected equipment;
input 1 DVD recorder 4;
input 2 video tape recorder 5.

In the table setting, a correlation table of the connected equipment is prepared typically by inputs through key operation by the user corresponding to a GUI display on the TV receiver, and is fetched by the remote controller 1. The memory 38 may store user operation immediately therebefore, or broadcasted images. The TV receiver 2 has, on the front face thereof, the operation section 33 provided with various operation keys. The front face is also provided with the receiver section 35 receiving infrared signals supplied from the remote controller 1, by which the received infrared signals are demodulated, supplied to the controller 32, and processed.

The TV receiver 2 of this embodiment has a function of wirelessly sending, as an infrared signal, the status signal which is a signal of information on the equipment connected to the input terminals, to the remote controller 1. More specifically, when switching was effected through the switching section 23 for input switching, the controller 32 judges the equipment connected to thus-switched input terminal on the basis of the table in the memory 38, and supplies the status signal, which is information indicating thus-judged equipment, to the transmitter section 36. The transmitter section 36 sends thus-supplied status signal as an infrared signal.

Figure 5:
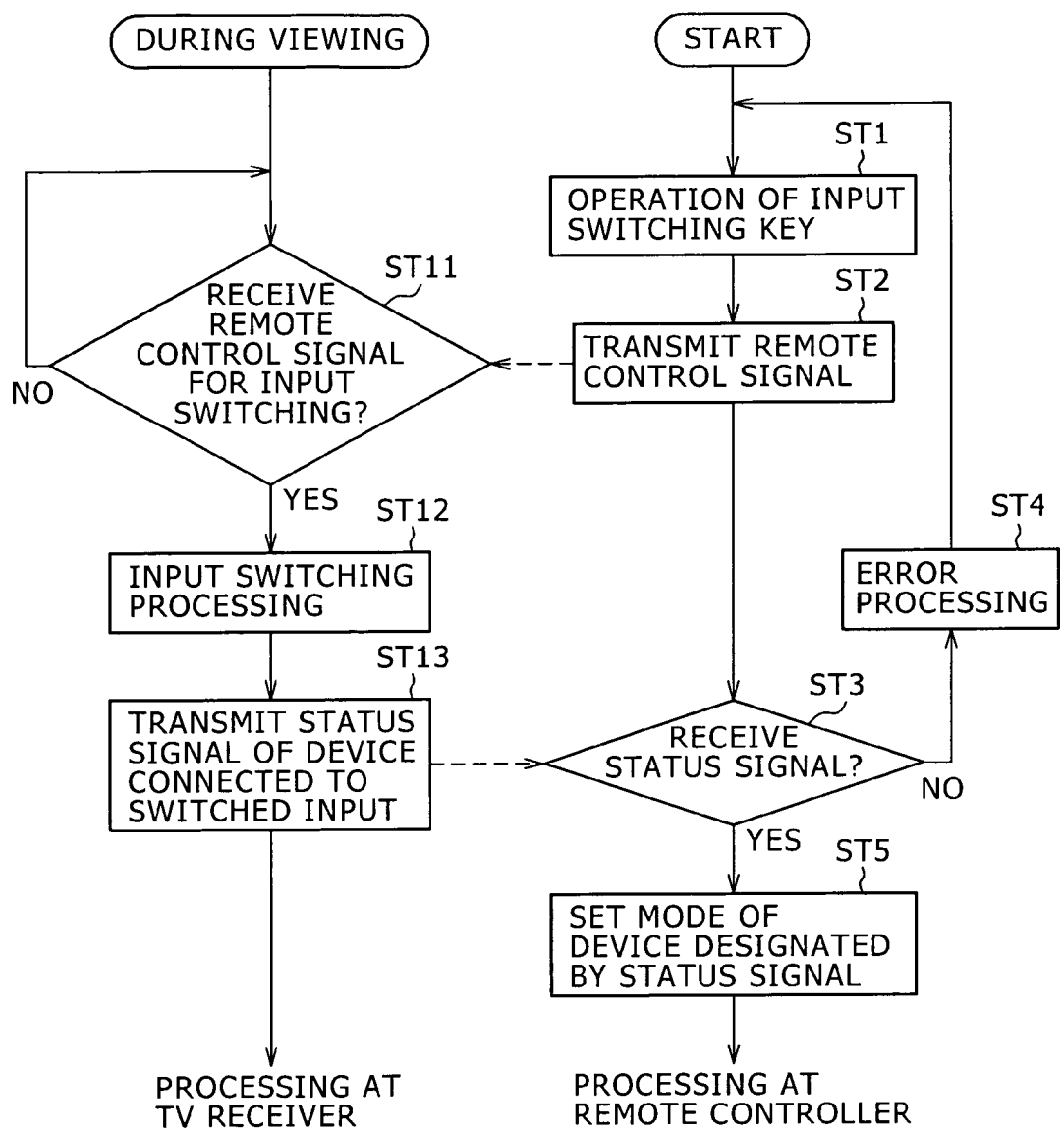
FIG. 5 is a flow chart showing an exemplary mode switching processing of the remote controller in one embodiment of the present invention.

Next paragraphs will describe an exemplary switching operation of the operation mode of the remote controller 1 according to the present invention, referring the flow chart shown in FIG. 5. The flow chart in FIG. 5 shows processing on the remote controller 1 on the right, and shows processing on the TV receiver 2 on the left. The TV receiver 2 is assumed herein as being viewed. When the microcomputer 17 judges first that the input switching key 11g of the remote controller 1 was operated (step ST1), a remote control signal directing the correspondent input switching is sent (step ST2). When the controller 32 of the TV receiver 2 judges receiving of the remote control signal (step ST11), the controller 32 selects the input of the TV receiver 2 so as to have the designated state (step ST12). The controller 32 of the TV receiver 2 then generates a status signal indicating the external equipment connected to thus-switched input terminal, and allows the transmitter section 36 to send the status signal out therefrom (step ST13).

The microcomputer 17 of the remote controller 1 judges whether the status signal was received or not (step ST3), and carries out error processing if it fails in receiving the status signal even if a certain length of time has elapsed after sending of the remote control signal in step ST2 (step ST4). The error processing is made typically so as to display the error by characters or the like on the display 14.

If the microcomputer 17 judges receiving of the status signal in step ST3, the microcomputer 17 then sets an operation mode allowing remote control of the external equipment designated by thus-received status signal (step ST5). The remote controller 1 can deliver codes for various equipment possibly connected, by holding them through preset or learning. The error display may also be such as flashing the characters.

Figure 6:
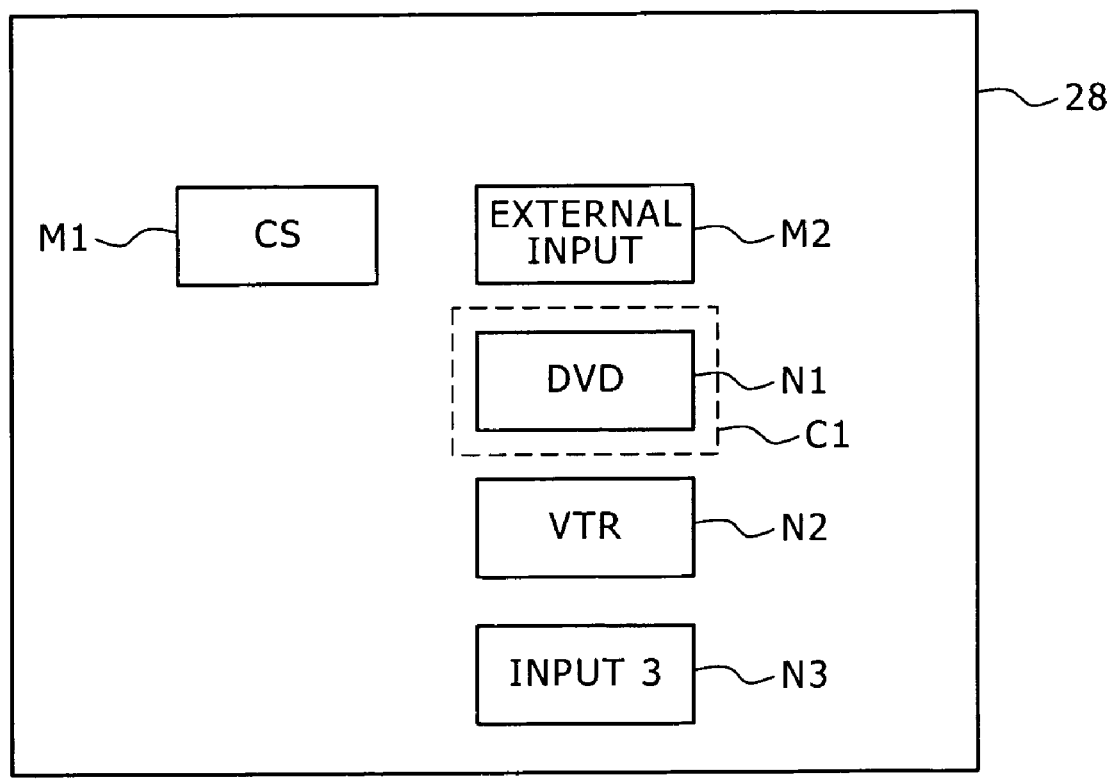
FIG. 6 is an explanatory drawing showing an exemplary equipment switching using a GUI menu in one embodiment of the present invention.

An exemplary switching among the equipment using a GUI menu will be explained referring to FIG. 6. In FIG. 6, the GUI menu is displayed on the display panel 29 of the TV receiver 2. The GUI menu allows tuning operation or the like, in addition to the input switching. A menu M1 herein shows that CS broadcasting has been tuned, and a menu M2 shows a menu allowing setting for switching the external inputs. The user first selects the external input switching menu in the menu M2. The selection operation can be effected by operating the direction key 11h and the enter key 11i, so as to move a cursor C1 up or down, and left or right. For the case where the TV receiver 2 is provided with the first and second inputs as the external inputs, the first terminal is preliminarily set to "DVD (DVD recorder 4)", and the second input is set to "VTR (video tape recorder 5)". When the electronic equipment wished to operate is the DVD recorder 4, the user moves the cursor C1 using the direction key 11h, and determines the input 1 (DVD) by operating the enter key 11i. In this case, the remote control signal is sent from the remote controller 1 to the TV receiver 2. The TV receiver 2 switches its input status to the first input, and sends the status signal corresponded to the first input to the remote controller 1. The remote controller 1 receives the status signal, switches its own mode to "DVD", and allows the display 14 to show "DVD". Now the user is allowed to operate the DVD recorder 4.

When the mode of the remote controller 1 is switched to "TV", and any tuning operation of broadcasting station channels is effected again, or any input switching operation for selecting other equipment is effected, a correspondent status signal is issued by the main unit, and the remote controller 1 receives it to thereby switch the mode. For a case where any electronic equipment is newly connected, the remote controller 1 is additionally set with the equipment correspondent to the input, to thereby enable operation of the electronic equipment.

In this way, it is made possible to switch the input of the receiver 2, and at the same time to switch also the mode of the remote controller 1.

Because the input switching on the TV receiver 2 in this case automatically results in the mode switching of the remote controller 1, it is no more necessary for the user to switch the mode on the remote controller 1 every time the input is switched, raising an effect of simple operation.

Because the input switching on the TV receiver 2 and the mode switching on the remote controller 1 are linked, it is no more necessary to provide operation keys to the remote controller 1 for every electronic equipment to be connected (direct keys of "DVD", "TV", "amplifier", for example), and this raises an effect of reducing erroneous operation by the user. It is also made possible to flexibly cope with various peripheral equipment and to switch them in a simple manner.

It is still also made possible to prevent radio interference by making difference in output timing, sending time, or oscillation frequency or the like between the remote control signal emitted from the remote controller 1 and the status signal emitted from the TV receiver 2.

The memory in the above-described embodiment was incorporated in the remote controller 1, whereas similar effects can be obtained by using other storage media. For example, it is also allowable to preliminarily store the settings of the remote controller in a detachable memory card, and allows other remote controller to read the memory card mounted thereon, so as to save labor of making the settings again.

The table described in the above embodiment, making correlation between the inputs and set modes to be stored in the memory of the remote controller 1, was such that correlating the first input with the DVD recorder 4, and the second input with the video tape recorder 5, whereas the settings are by no means limited to these settings, allowing other various connections such as connecting the video tape recorder 5 to the first input. It is also allowable to provide a plurality of inputs, and to make settings respectively for necessary equipment to be connected. The settings of the correlation table in the above-described embodiment were made through the GUI menu, whereas the correlation table may be set also by correlating the input and the equipment to be operated to the display 14 of the remote controller 1.

The input switching operation on the TV receiver 2 in the above-described embodiment was effected by pressing the input switching key 11g of the remote controller 1, whereas it is also allowable to display an input switching menu on the display panel 29, and to select the input using the direction key 11h and the enter key 11i. It is still also allowable to provide input keys such as "INPUT 1", "INPUT 2" ... and so on to the remote controller 1, to thereby allow the user to press the input keys for input switching.

The remote controller 1 or the TV receiver 2 may be provided with an external input terminal allowing therethrough connection with an external network, and downloading various data via the network. Because various electronic equipment have newly been proposed in recent years, downloading of programs, data and so forth via the network can make the connection adaptive even to the most recent electronic equipment, and can allow the display 14 to show thereon the name of the equipment to be operated.

In the above-described embodiment, the remote controller was adopted to the equipment operation system in which the various peripheral equipment were connected to the TV receiver, whereas the remote controller may be configured as the one for an operation system in which a compact disc (CD) player, a tuner and so forth are connected to an amplifier configured so as to process audio signals switched among the equipment. It is still also allowable to connect peripheral devices such as a printer and a storage to a computer, so that only a single remote controller can operate these peripheral devices en bloc.

In the above-described embodiment, the present invention was applied to the remote controller capable of wirelessly transmitting and receiving infrared signals, whereas the present invention may also be applied to radio-frequency wireless signals based on other signal systems. The present invention is still also applicable to a remote controller wired through a communication cable.

Figure 7:
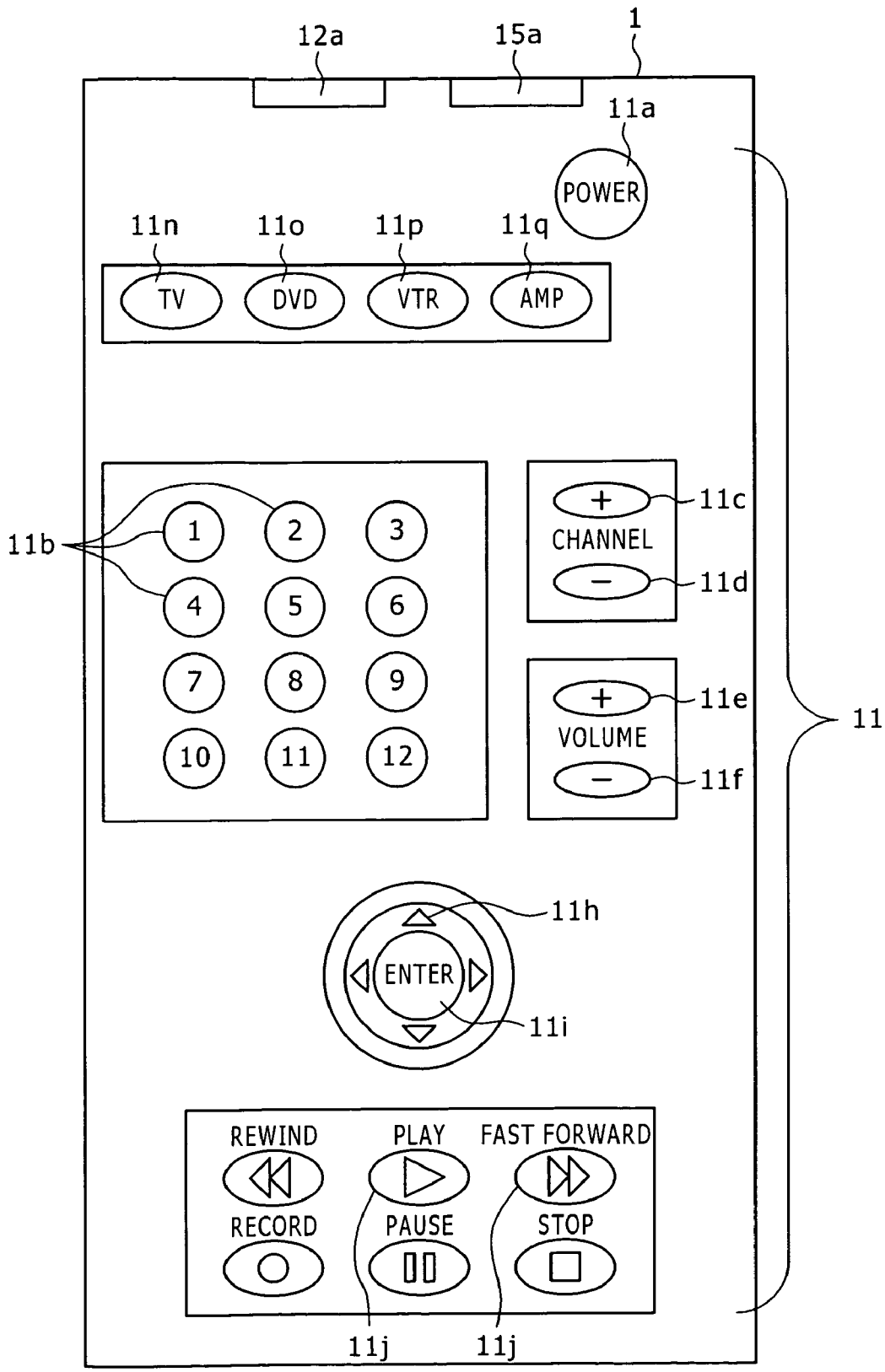
FIG. 7 is an external configuration drawing showing an exemplary remote controller in another embodiment of the present invention.

In the above-described embodiment, the mode switching was shown on the display 14 linked with the operation switching up key 11k and the down key 11m so as to allow the user to make judgment, whereas the remote controller 1 may be equipped with self-illuminating keys having indications of "TV", "DVD", "VTR", "AMP" and the like. An exemplary external configuration of a remote controller equipped with such self-illuminating keys will be explained referring to FIG. 7. In FIG. 7, any components correspondent to those shown in FIG. 2 already described in the above will be given with the same reference numerals. Mode switching keys 11n to 11q for mode switching are provided, which are equipped with a self-illuminating function allowing themselves to illuminate for a predetermined length of time with the aid of the built-in LEDs, when the mode was switched to any of the electronic equipment indicated by characters printed on these keys 11n to 11q. The mode switching key 11n having "TV" printed thereon corresponds to the tuner 22, the mode switching key 11o having "DVD" printed thereon corresponds to the DVD recorder 4 connected to the first input terminal 29, and the mode switching key 11p having "VTR" printed thereon corresponds to the video tape recorder 5 connected to the second input terminal 30. The mode switching key having "AMP" printed thereon is corresponded to an AV amplifier connected to other input terminal not shown. When the user presses the mode switching key 11o of "VTR 1", the input of the TV receiver 2 is set to "first input terminal" so as to allow supply of video/audio signals from the DVD recorder 4. The mode switching key 11o for "DVD" at this time illuminates. Because the self-illuminating key for the operation equipment corresponded to the switched input is lit on upon receiving of the status signal from the TV receiver 2, the user can visually recognize the mode of the remote controller 1 in a more simple manner, and is prevented from erroneous operation.

It should be understood by those skilled in the art that various modifications, combinations, sub-combinations and alterations may occur depending on design requirements and other factors insofar as they are within the scope of the appended claims or the equivalents thereof.

What is claimed is:

1. A remote controller capable of sending a remote control signal corresponding to each of a plurality of control-target equipment by mode switching, and allowing for remote control of a selection, made by one specific control-target equipment out of said plurality of control-target equipment, based on a signal from another control-target equipment, comprising:
a plurality of keys arranged on said remote controller and configured to send a remote control signal allocated to each of said keys when operated to remotely control a plurality of control-target equipment;
an input selection key provided as one of said plurality of keys and configured to direct said selection to said one specific control-target equipment to change an input to said one specific control-target equipment;
a receiver configured to receive a connected equipment signal sent from said one specific control-target equipment in response to the operation of said input selection key;
a controller configured to
generate a remote control signal corresponding to an operation of said input selection key,
supply the remote control signal to a transmitter, and
switch a mode of the remote controller to control via the remote control signal control-target equipment designated by the connected equipment signal;
a transmitter configured to send the remote control signal generated by said controller; and
a display configured to display information of the control-target equipment selected by said controller.

2. The remote controller as claimed in claim 1, wherein said input selection key is a toggle key sequentially switching the input selection made on said one specific control-target equipment upon every operation.

3. The remote controller as claimed in claim 1, wherein:
said one specific control-target equipment is video equipment or audio equipment configured to process video signals or audio signals input thereto, and
said input selection key is a key specifying generation of a remote control signal selecting the input video signals or the input audio signals on said video equipment or said audio equipment.

4. The remote controller as claimed in claim 1, wherein information on the control-target equipment displayed on said display is a name of the control-target equipment selected by said controller.

5. An equipment operation system comprising:
a specific control-target equipment controlled by a remote control signal from a remote controller, including:
an equipment receiver configured to receive a remote control signal;
a plurality of input sections;
an input selector configured to select signals obtained at said plurality of input sections;
a memory section configured to memorize connected equipment connected to each of said plurality of input sections;
an equipment controller, instructed by said input selector, when selection by said input selector is directed by the remote control signal received by said equipment receiver, said equipment controller being configured to identify, by reading from said memory section, an equipment connected to an input section corresponding to the selected signal; and
a transmitter configured to send a signal of information on the device identified by said controller; and
a remote controller configured to send remote control signals corresponding to each of a plurality of control-target equipment by mode switching, including:
a plurality of keys arranged on said remote controller and configured to send a remote control signal allocated to each of said keys when operated to remotely control a plurality of control-target equipment;
an input selection key provided as one of said plurality of keys, and configured to direct said selection to said specific control-target equipment to change an input to said one specific control-target equipment;

a receiver configured to receive a connected equipment signal sent from said specific control-target equipment in response to the operation of said input selection key;

a controller configured to
generate a remote control signal corresponding to an operation of said input selection key,
supply the remote control signal to a transmitter, and
switch a mode of the remote controller to control via the remote control signal control-target equipment designated by the connected equipment signal;

a transmitter configured to send the remote control signal generated by said controller; and a display configured to display information of the control-target equipment selected by said controller.

6. A remote control method for remotely controlling control-target equipment by sending a remote control signal allocated to each of a plurality of keys, and for sending a remote control signal corresponding to each of a plurality of control-target equipment by mode switching, with one specific control-target equipment out of said plurality of control-target equipment being capable of selecting a signal from another control-target equipment to allow remote control of said selection, the method comprising:

directing, at an input section, a selection from an input selection key of said plurality of keys to said one specific control-target equipment to change an input to said one specific control-target equipment;

receiving, at a receiver, a connected equipment signal sent from said one specific control-target equipment in response to the operation of said input selection key;

switching, at a controller, a mode of the remote controller to control via the remote control signal control-target equipment designated by the connected equipment signal; and displaying, at a display, information on the selected control-target equipment.

7. The remote controller of claim 1, wherein the controller effects the mode switching when the connected equipment signal is received after the remote control signal is sent by the transmitter.

8. The remote control method of claim 6, wherein effecting the mode switching is performed when the connected equipment signal is received after a remote control signal has been transmitted by operation of the input selection key of the directing step.

9. The remote controller of claim 1, wherein the controller further performs error processing to display an error message on the display when the connected equipment signal is not received.

10. The remote control method of claim 6, further comprising:

displaying, at the display, and error message when the connected equipment signal is not received.

* * * * *